Dec. 19, 1950 B. G. JONES 2,534,869
MOTOR VEHICLE TIRE
Filed Nov. 19, 1945 2 Sheets-Sheet 1
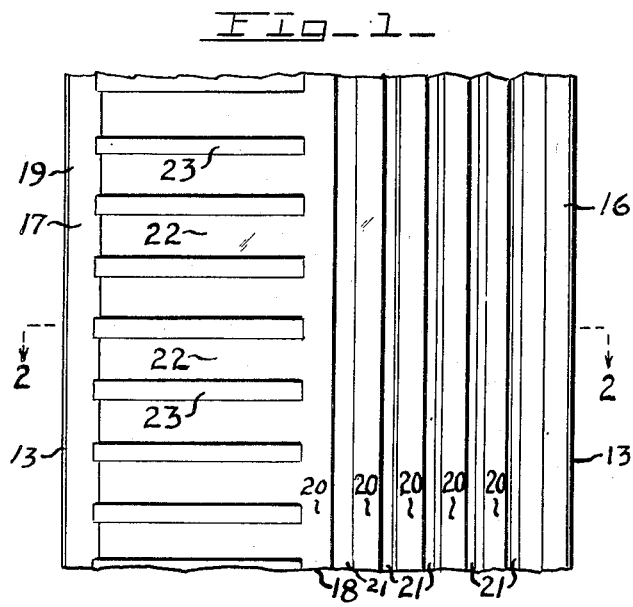
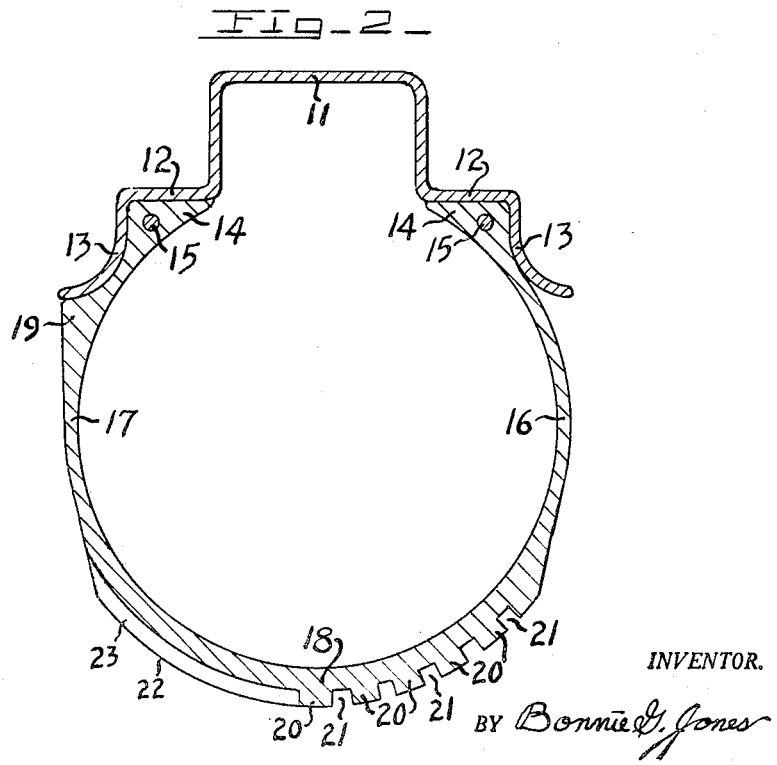
INVENTOR.
BY Bonnie G. Jones

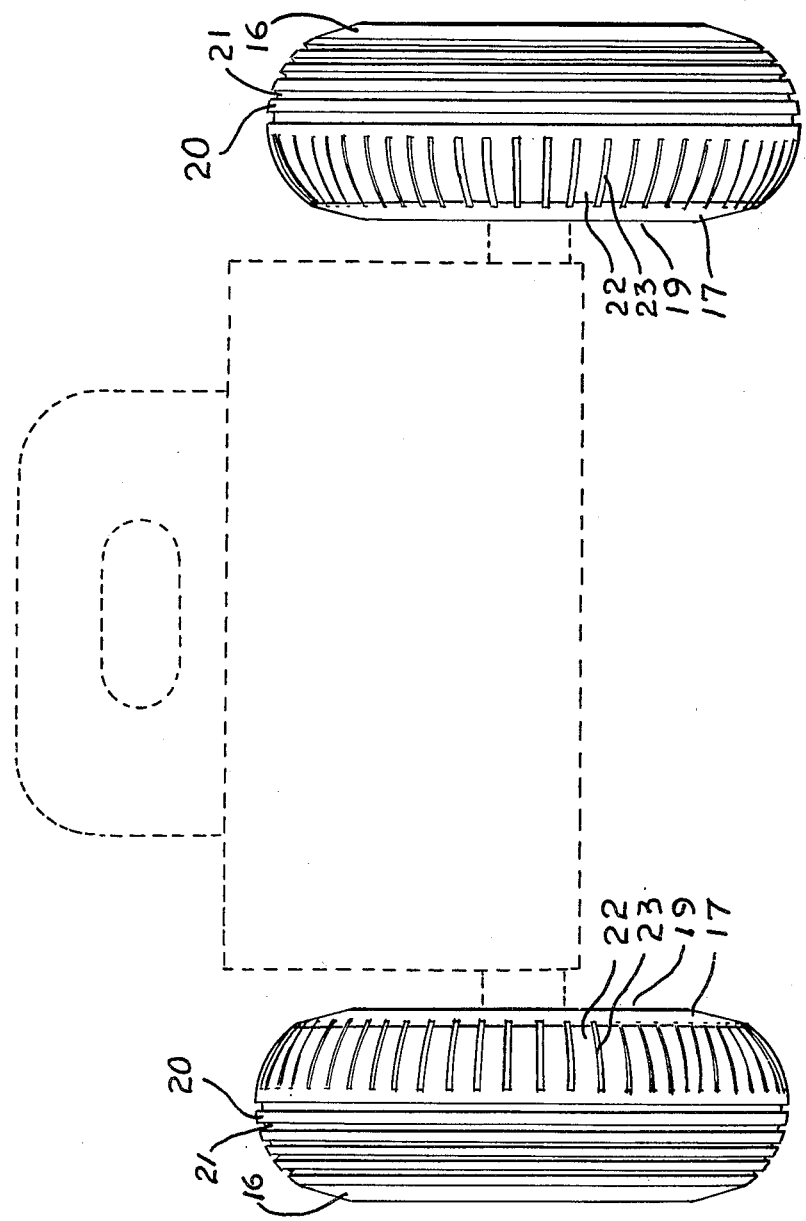

Patented Dec. 19, 1950

2,534,869

UNITED STATES PATENT OFFICE 2,534,869

MOTOR VEHICLE TIRE

Bonnie G. Jones, Williamsburg, Ky.

Application November 19, 1945, Serial No. 629,416

1 Claim. (Cl. 152—209)

This invention pertains to improved tire treads and means for obtaining favorable air-pressure differentials in the opposing tires during lateral thrusts so said treads and said differentials may cooperate to minimize lateral skidding and afford safer steering-control of the vehicle during deceleration.

My primary object is to provide a dual-purpose tire tread and to dispose it in a manner with respect to the tire casing and the center line of the vehicle so one type of tread opposes lateral skidding during lateral thrusts and another type of tread opposes longitudinal skidding when braking or decelerating by compression during such thrusts.

A further object is to so proportion the total peripheral area of the tread members with respect to the inwardly offset area defined thereby as to normally provide a relatively greater area of actual contact with the pavement for a given pavement-depressed area of the traction portion of the tread than obtains when a like given area of the anti-skid portion of the tread is thus depressed.

Further objects reside in the attendant method of relatively controlling the potentialities of laterally-opposed tires, particularly with respect to traction, lateral and longitudinal skidding.

My invention will be better appreciated from the following description and claim and from the drawing, in which the latter:

Fig. 1 is a plan view of a sector of the tire and tread.

Fig. 2 is a cross-sectional view of same on the plane of line 2—2 of Fig. 1; and Fig. 3 is a rear view of a vehicle showing such tires properly mounted.

A conventional rim has a drop center 11, bead seats 12—12 and bead-retaining flanges 13—13. A tire casing comprises straight-side beads 14—14, bead reinforcements 15—15, side walls 16 and 17 and tread 18. The tire may be conventional in every respect excepting for the improved tread and the one sidewall which has a reinforced or built-up area 19. The tread comprises annular ribs at 20 formed by annular grooves 21 and lateral ribs 22 formed by lateral grooves 23. Sidewall 17 may be built up simply with rubber and fabric to form area 19 which should contact the bead-retaining flange. This prevents sidewall 17 from normally flexing around its flange, whereas sidewall 16 has normal freedom to flex around its adjacent flange. When two such tires are mounted in opposition, with sidewalls 17 toward the center line of the vehicle, the thrust-receptive tire flexes less than normal laterally but sufficiently to force the annular tread substantially in contact with the pavement despite the increased volume of fluid displaced by its area 19, the thrust-relieved tire simultaneously flexing laterally to force its cross tread substantially in contact with the pavement, its sidewall 16 flexing normally around its flange while its sidewall 17 flexes substantially normally away from its flange. Thus the thrust-receptive tire, which is best suited to prevent lateral skidding by reason of its sustaining a major portion of the vehicle load, engages its most appropriate tread with which to minimize lateral skidding, while the thrust-relieved tire, which normally suffers a deficiency of braking ability with which to prevent longitudinal skidding, also has has its most appropriate tread substantially in contact with the pavement.

The annular and lateral grooves are the same size in their cross sections, whereas the lateral ribs are wider than the annular ribs; this also affords a relatively greater area of pavement contact by the thrust-relieved tire. For example: Assuming that ribs 20 and grooves 21 each are respectively 4 and 3 units wide as measured transversely of the tread, and that ribs 22 and grooves 23 each are respectively 6 and 3 such units as measured circumferentially of the tread; It will be seen that the actual pavement contact area by the peripheral faces of the combined ribs averages approximately 62% of the total tread area depressed by the pavement and that such percentage may automatically increase or decrease in response to lateral flexing of the tire, such as due to lateral vehicular thrusts, whereby, when such tires are mounted as in Fig. 3, the thrust relieved tire may have as much as 64% of the pavement depressed area engaged by the combined peripheral faces of ribs 20 and 22, while the thrust receptive tire may simultaneously have only about 60% of such depressed area engaged by such faces of its ribs.

The lateral pavement-gripping potentialities of the two types of tread also favorably influence such relative annular ribs, by reason of their favorable lateral pavement-gripping potentialities, to cause complemental tension in sidewall 16 of the thrust-receptive tire while the favorable lateral skidding tendencies of the cross ribs on the thrust-relieved tire tend to minimize the tension in its sidewall 17. Such sidewall stresses react on the fluid in the respective tires whereby to provide a greater differential of fluid pressure, with respect to the right and left tires, than would normally accrue if a like lateral force were to act on a like vehicle having tire tread members disposed conventionally. The longitudinal pavement-gripping potentialities of both types of tread are also influenced both by the relative mechanical "bite" afforded by tread design and by the relative contact areas during lateral thrusts. Thus the sidewall and tread features mutually contribute to controlling the relative pavement-contact area of laterally-opposed tires, during lateral thrusts, thereby favorably influencing their relative friction of contact in combination with the relative angularity of their tread members, which latter are very effectively engaged during such thrusts. Such combination is particularly desirable for negatively accelerating a vehicle during average pavement conditions. However, some of the outlined advantages should obtain by employing this tread in combination with a conventional casing or by combining this improved sidewall with a laterally symmetrical tread. The tread here disclosed was selected arbitrarily from many combinations of treads which may be successfully incorporated in the invention either as integral treads as illustrated or detachably secured to the tire as are anti-skid chains.

The term "anti-skid" as employed herein to describe tread members has reference to annular ribs and modifications thereof which latter may be elongate members disposed with their longitudinal axes running circumferentially, or substantially circumferentially, of the tread. The term "traction" as employed herein to describe tread members has reference to cross ribs and modifications thereof which latter may be elongate members disposed with their longitudinal axes running transversely, or substantially transversely, of the tread.

It should be said that such tires, when constructed and mounted in accordance with the rules outlined, also automatically provide laterally-equalized braking and traction potentialities when such lateral forces are absent or act in combination to provide lateral equilibrium.

Having thus fully described my invention and having illustrated my choice embodiment thereof, I claim:

In a pneumatic tire; a tread comprising annular ribs disposed exclusively between one edge and the approximate center line of said tread, and cross ribs disposed exclusively between the opposing edge and said line.

BONNIE G. JONES.

REFERENCES CITED

The following references are of record in the file of this patent:

UNITED STATES PATENTS

| Number | Name | Date |
|---|---|---|
| 952,132 | Neary | Mar. 15, 1910 |
| 1,956,011 | Evans | Apr. 24, 1934 |
| 2,108,329 | Carter | Feb. 15, 1938 |

FOREIGN PATENTS

| Number | Country | Date |
|---|---|---|
| 38,887 | Norway | 1924 |